United States Patent
Nishikawa

Patent Number: 6,055,075
Date of Patent: Apr. 25, 2000

[54] METHOD OF RECORDING, AND REPLICATING A REFLECTION HOLOGRAM

[75] Inventor: Shingo Nishikawa, Tokyo, Japan

[73] Assignee: Dai Nippon Printing Co., Ltd., Tokyo, Japan

[21] Appl. No.: 09/102,481

[22] Filed: Jun. 22, 1998

[30] Foreign Application Priority Data

Jun. 27, 1997 [JP] Japan ................................... 9-172112

[51] Int. Cl.[7] .................................................. G03H 1/20
[52] U.S. Cl. ........................................................ 359/12
[58] Field of Search .................................. 359/1, 12, 15, 359/35, 10, 30, 31, 19

[56] References Cited

U.S. PATENT DOCUMENTS

| | | | |
|---|---|---|---|
| 4,995,685 | 2/1991 | Armstrong et al. | 359/3 |
| 5,695,894 | 12/1997 | Clube | 430/1 |

OTHER PUBLICATIONS

H. J. Caulfield, "Handbook of Optical Holography," Academic Press, pp. 570–571, 1979.

Primary Examiner—Cassandra Spyrou
Assistant Examiner—Craig Curtis
Attorney, Agent, or Firm—Dellet and Walters

[57] ABSTRACT

The invention provides a method of recording, and replicating a reflection hologram, which enables reference light or object light to strike on a holographic recording material at an angle of incidence that is approximate to 90° or larger than the critical angle. With the reflection hologram-replicating method, the reflection hologram can be continuously replicated by allowing replicating illumination light to strike on the holographic recording material at any desired angle of incidence other than verticality. A wavefront conversion type transmission hologram 1' is located in close contact with one surface side of a reflection hologram recording material 6 while a reflection hologram plate 7 is located in close contact with the other surface side thereof. The reflection hologram plate 7 is replicated by interference in the photographic material 6 between light 5 produced upon incidence of illumination light 4 on the wavefront conversion type transmission hologram 1', in which at least one of the wavefront shape and direction thereof is converted, and light 8 produced upon diffraction of light 5 by striking on the plate 7 through the holographic recording material 6.

1 Claim, 4 Drawing Sheets

METHOD OF RECORDING, AND REPLICATING A REFLECTION HOLOGRAM

BACKGROUND OF THE INVENTION

The present invention relates generally to a method of recording, and replicating a reflection hologram, and more particularly to a method of recording, and replicating a reflection hologram, wherein reference light, and reconstructing illumination light is allowed to strike on a holographic recording material via a transmission hologram.

When a reflection hologram is recorded or when a reflection hologram is replicated from a reflection hologram plate, no problem arises if the angle of incidence of reference light or reconstructing illumination light on a holographic recording material is small. In a certain arrangement, however, it is required that the light be incident on the holographic recording material at a deep angle that is approximate to 90°. In one such arrangement, a light source of reconstructing illuminating light for a reflection hologram is located at a position above a hologram and in the vicinity of a hologram surface. In another arrangement, it is required to allow reference light or the like to strike via a prism or the like on the holographic recording material at an angle larger than the critical angle.

In the prior art, there is also known a reflection hologram-replicating method using a holographic recording material wound around a cylindrical drum with a reflection hologram plate put over the surface thereof, wherein, while the holographic recording material is continuously fed in unison with the rotation of the drum, it is illuminated with replicating illumination light, thereby replicating a reflection hologram continuously.

When, as mentioned above, reference light or the like is required to strike on a holographic recording material at a large angle of incidence for the recording, and replication of a reflection hologram, there is not only an exposure efficiency drop due to Fresnel reflection, shading, etc. at the interface but also the uniformity of the quantity-of-light distribution over the irradiated hologram surface becomes worse. In the continuous replication of a reflection hologram such as one mentioned above, replicating illumination light should strike vertically on a hologram plate; the angle of incidence of the light on the hologram plate is limited to 0°. In other words, the incidence of constructing illumination light at other angles is not permitted.

SUMMARY OF THE INVENTION

In view of such problems with the prior art, an object of the present invention is to provide a method of recording, and replicating a reflection hologram which enables reference light or reconstructing illumination light to strike on a holographic recording material at an angle of incidence close to 90° or at an angle larger than a critical angle, and replicating illumination light to strike on a reflection hologram plate at any desired angle of incidence other than 90°, thereby achieving continuous replication of a reflection hologram.

According to the present invention, the aforesaid object is achieved by the provision of a reflection hologram-recording method, characterized in that:

a reflection hologram is recorded in a reflection hologram recording material by allowing obliquely incident reference light to strike on one surface side of said reflection hologram recording material via a wavefront conversion type transmission hologram and allowing object light to strike on other surface side of said reflection holographic recording material, so that said reference light and said object light interfere in said reflection hologram recording material.

Preferably in this case, the wavefront conversion type transmission hologram has a wavefront conversion action on the conversion of an almost vertically incident parallel light beam into a divergent light beam that diverges from a virtual divergent point located near to and outside of the hologram surface. It is also preferable that the wavefront conversion type transmission hologram has a wavefront conversion action on the conversion of an almost vertically incident parallel light beam into a convergent light beam that converges into a virtual collective point located near to and outside of the hologram surface.

The present invention also provides a reflection hologram-replicating method, characterized in that:

a reflection hologram plate is replicated in a reflection hologram recording material by locating a wavefront conversion type transmission hologram in close contact with or away from one surface side of said reflection hologram recording material, locating a reflection hologram plate in close contact with or away from other surface side of said reflection hologram recording material, and allowing illumination light to strike on said wavefront conversion type transmission hologram to produce a light beam in which at least one of a wavefront shape and a wavefront direction thereof is converted by said wavefront conversion type transmission hologram, and allowing said light beam to strike on said reflection hologram plate through said reflection hologram recording material to produce a diffracted light beam, so that said reflection hologram plate is replicated in said reflection hologram recording material by interference between said light beams.

Preferably in this case, the wavefront conversion type transmission hologram has a wavefront conversion action on the conversion of an almost vertically incident parallel light beam into a light beam in which at least one of the wavefront shape and said wavefront direction thereof differs. In this method, said reflection hologram recording material and said wavefront conversion type transmission hologram are each provided in a belt form, said reflection hologram plate is put over a surface of a cylindrical drum, said reflection hologram recording material and said wavefront conversion type transmission hologram are wound around said surface of said cylindrical drum in the described order, said cylindrical drum is rotated to feed said reflection hologram recording material and said wavefront conversion type transmission hologram at the same peripheral speed as said cylindrical drum and in unison with rotation of said cylindrical drum, and said illumination light is directed toward a center of said cylindrical drum at a position where said reflection hologram recording material and said wavefront transmission hologram are in superposed alignment with said cylindrical drum, so that said reflection hologram plate can be continuously replicated.

According to the present invention, reference light or illumination light is allowed to strike on a reflection hologram recording material via a wavefront conversion type of transmission hologram for the recording, and replication of the reflection hologram, as can be understood from the foregoing. Consequently, even when reference light or illumination light is incident on the reflection hologram recording material at a large angle of incidence, the holographic recording material can be irradiated with the incident light with high exposure efficiency and a uniform quantity-of-light distribution over the irradiated surface. With a simple arrangement, it is possible to make the angle of incidence of illumination light larger than the critical angle. For continuous replication, it is possible to use not only vertical parallel light but also other incident light of any desired configuration.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Preferred embodiments of the method of recording, and replicating a reflection hologram according to the present invention are now explained.

Figure 1A:
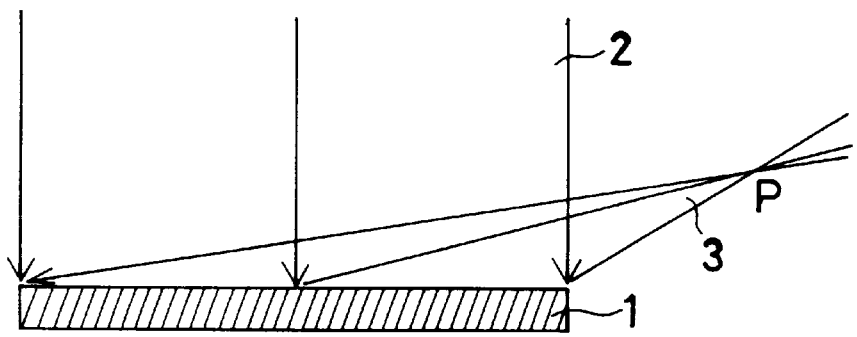
FIG. 1(a) is illustrative of a typical arrangement used for transmission hologram fabrication according to the present invention.
Figure 1B:
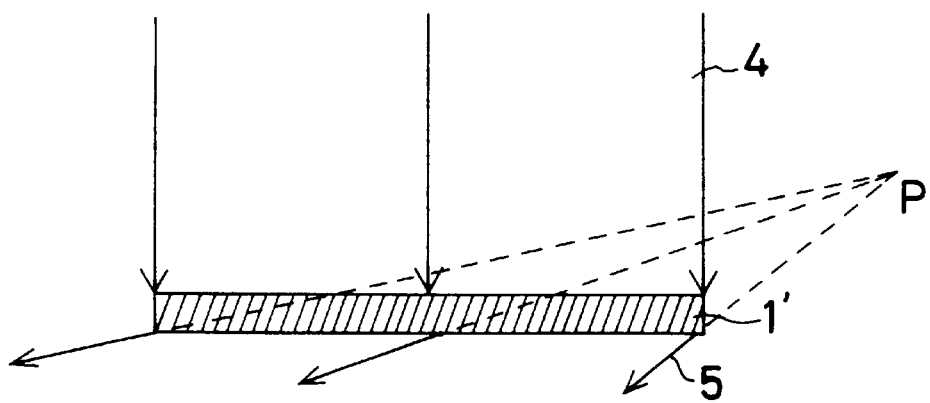
FIG. 1(b) is illustrative of how the transmission hologram of FIG. 1(a) acts.

First, a typical transmission hologram used herein is explained. FIG. 1(a) is illustrative of an exemplary arrangement for the fabrication of that transmission hologram. In a transmission hologram recording material 1 such as a silver salt film, parallel light 2 almost vertically incident on one side thereof interferes with light 3 that diverges from a point P located in the vicinity of and outside of the surface of the holographic recording material 1 and strikes on the same side of the holographic recording material 1 at an angle of incidence approximate to 90°, yielding a transmission hologram having a diffraction efficiency that is approximate to 100%. This hologram is shown at 1'. FIG. 1(b) is illustrative of how the transmission hologram 1' acts. As illumination light 4 similar to the recording parallel light 2 strikes almost vertically on the transmission hologram 1', the light 4 is diffracted through the hologram 1', so that it is converted into divergent light 5 that leaves the transmission side (back side) thereof from a virtual divergent point defined by the point P used for recording. In other words, the transmission hologram 1 has a wavefront conversion action on the conversion of the illumination light 4 almost vertically incident thereon into the light having a deep angle of incidence with respect to the virtual divergent point P. In this regard, it is to be noted that the light 5 upon conversion is not always divergent light.

Figure 2:
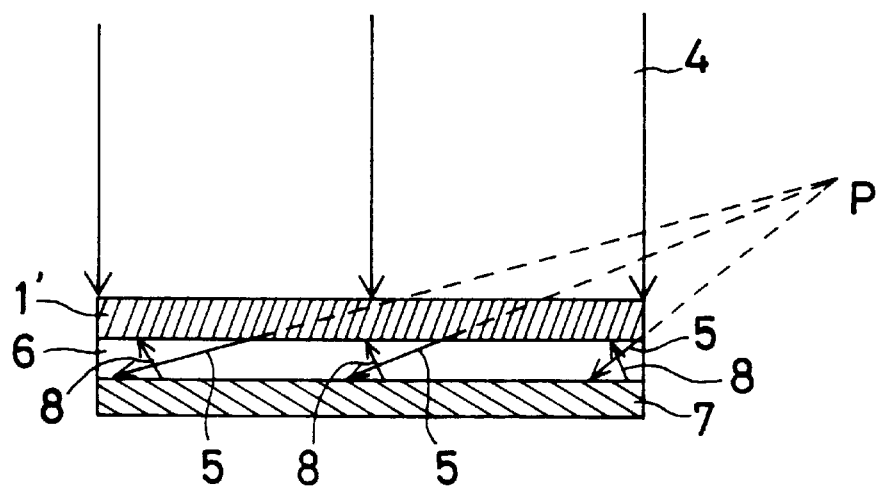
FIG. 2 is illustrative of a typical arrangement for reflection hologram replication according to the present invention.

In the present invention, the transmission hologram 1' having such a wavefront conversion action is used to record, and replicate a reflection hologram. FIG. 2 is illustrative of an arrangement for reflection hologram replication. A reflection hologram recording material 6 such as a photopolymer is located in close contact with, or away from, the transmission side of the transmission hologram 1' with an index-matching liquid placed between them. It is to be noted that when illumination light should strike onto the holographic recording material 6 at an angle larger than the critical angle, they should always come in close contact with each other with the index-matching liquid placed between them. Then, a reflection hologram plate 7 is located in close contact with, or away from, the side of the holographic recording material 6 that is not opposite to the transmission hologram 1', while the index-matching liquid is placed therebetween.

Upon almost vertical incidence of illumination light 4 on the transmission hologram 1', the light 4 is converted into divergent light 5 leaving the virtual divergent point P, which in turn strikes onto the reflection hologram recording material 6. This light 5 then strikes on the reflection hologram plate 7 through the reflection hologram recording material 6, wherein it is diffracted into reconstructing light 8. This light 8 is then incident on the back side of the reflection hologram recording material 6, wherein it interferes with the incident divergent light 5 for the replication of the reflection hologram plate 7.

Figure 3:
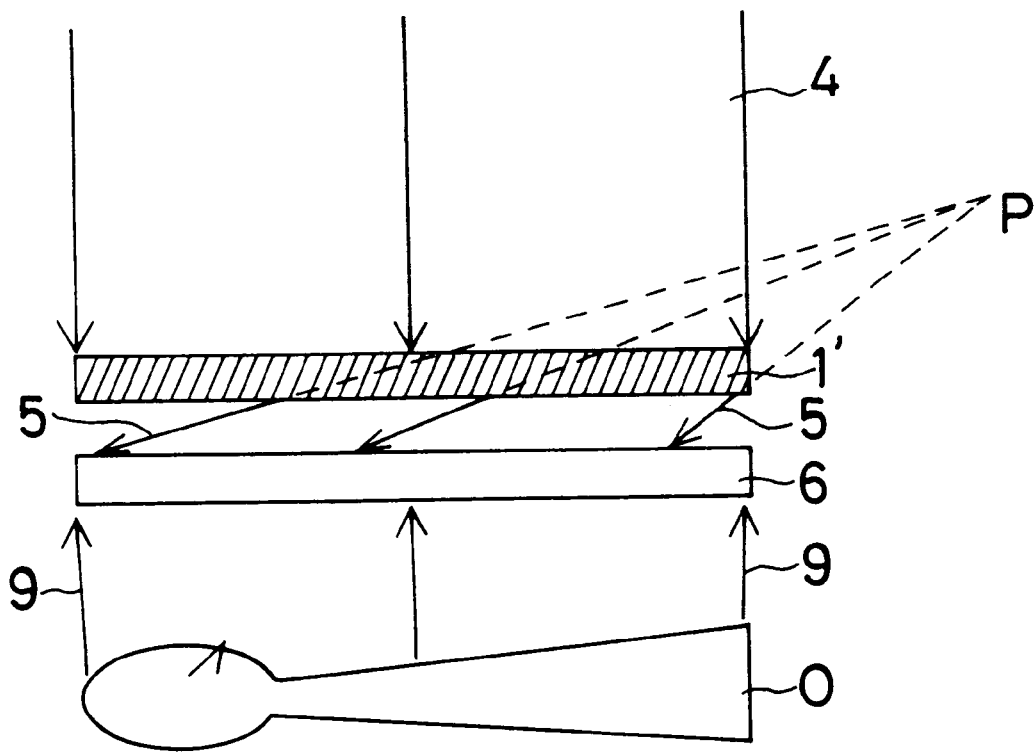
FIG. 3 is illustrative of a typical arrangement for reflection hologram recording according to the present invention.

By use of the transmission hologram 1' having such a wavefront conversion action, it is possible to replicate the reflection hologram plate with high exposure efficiency and a uniform quantity-of-light distribution over the illuminated surface, even when the angle of incidence of the illumination light 5 on the reflection hologram recording material 6 is large. With this simple arrangement, it is also possible to make the angle of incidence of the illumination light larger than the critical angle The present invention is then explained with reference to FIG. 3 that is illustrative of one exemplary arrangement for recording a reflection hologram for an actual subject O, using the aforesaid transmission hologram 1' having such a wavefront conversion action. In this embodiment, a reflection hologram recording material 6 such as a photopolymer is located in close contact with, or away from, the transmission side of the transmission hologram 1' while an index-matching liquid is placed therebetween. For a better understanding of FIG. 3, the transmission hologram 1' is shown to be spaced away from the transmission hologram recording material 6. The subject O is located on the side of the holographic recording material 6 that is not opposite to the transmission hologram 1'. Upon almost vertical incidence of illumination light 4 on the transmission hologram 1', the light 4 is converted into divergent light 5 leaving a virtual divergent point P. The divergent light 5 then serves as reference light to strike on the surface side of the reflection hologram recording material 6 at a deep angle of incidence. On the other hand, the subject O is illuminated with another illumination light that is coherent with respect to the illumination light 4. This light is scattered at the subject O to produce object light 9, which is in turn incident on the back side of the reflection hologram recording material 6 for interference with the reference light 5 in the reflection hologram recording material 6, so that the reflection hologram for the subject O can be recorded. In this case, too, the transmission hologram 1' having the wavefront conversion action can be used to obtain the reference light 5, so that the reference light 5 can be produced with high exposure efficiency and a uniform quantity-of-light distribution over the illuminated surface, even when the angle of incidence of the reference light 5 on the reflection hologram recording material 6 is large. With this simple arrangement, it is also possible to make the angle of incidence of the reference light 5 larger than the critical angle.

Referring again to the transmission hologram 1' prepared as shown in FIG. 1, parallel illumination light that propagates in the reverse direction to the recording parallel light 2 is diffracted upon almost vertical incidence on the opposite side of the transmission hologram 1'. Upon diffraction, the light is converted into convergent light that leaves the transmission side of the transmission hologram 1' while the point P for recording acts as a virtual collective point. In other words, the transmission hologram 1' has also a wavefront conversion action on the conversion of almost vertical incident light into light having a deep angle of incidence with the virtual collective point defined by the point P. With an arrangement similar to that shown in FIG. 2 or FIG. 3, it is thus possible to replicate the reflection hologram plate 7, and record the reflection hologram for the subject O. To obtain convergent light using a conventional optical element such as a lens, it is required to rely upon an optical element larger than the reflection hologram recording material 6. However, the use of such a transmission hologram 1' has an additional merit of obtaining convergent light by using an optical element of the same size as the reflection hologram recording material 6.

Figure 4:
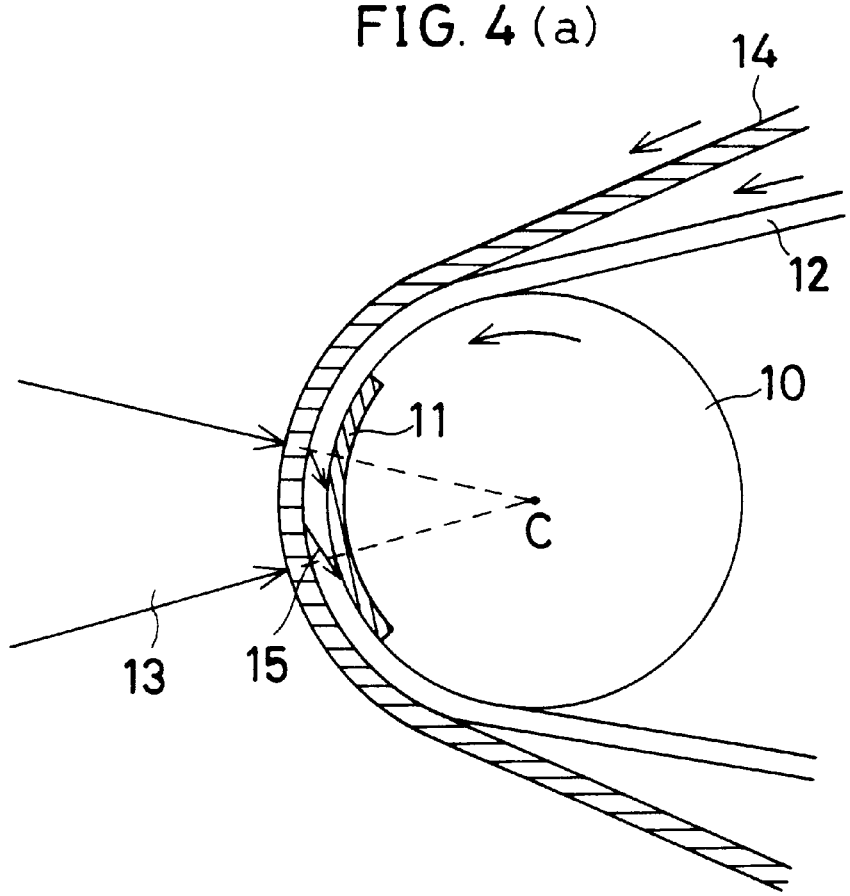
FIG. 4(a) is illustrative of part of a conventional arrangement the continuous replication of a reflection hologram.
FIG. 4(b) is illustrative of part of a general arrangement for the continuous replication of a reflection hologram according to the present invention.
Figure 4:
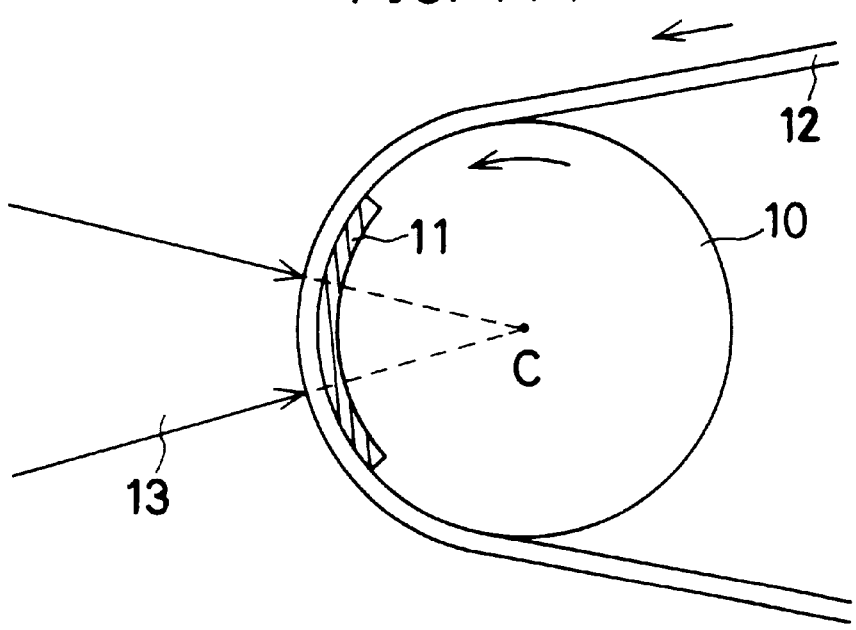

In a method so far known to achieve continuous reflection hologram replication, a holographic recording material is wound around a cylindrical drum with a reflection hologram plate put over the surface thereof. The holographic recording material is irradiated with illumination light for hologram replication while the holographic recording material is continuously fed in unison with the rotation of the drum. FIG. 4(b) is illustrative of part of the arrangement used to this end. A reflection hologram plate 11 is put over the surface of a cylindrical drum 10. A belt form of reflection hologram recording material 12 is wound around the cylindrical drum 10. In unison with the rotation of the cylindrical drum 10 in a direction shown by an arrow, the reflection hologram recording material 12 is fed at the same linear speed as the cylindrical drum 10 in a direction shown by an arrow. During this continuous feeding, illumination light 13 is directed to a position where the reflection hologram recording material 12 is in alignment with the reflection hologram plate 11. With the illumination light 13 directed toward a center C of the cylindrical drum 10, the illumination light 13 strikes vertically on the reflection hologram plate 11 irrespective of where it is rotated. Consequently, the illumination light 13 is diffracted relatively in the same direction irrespective of where the reflection hologram plate 11 is rotated, so that the reflection hologram plate 11 can be continuously replicated in the reflection hologram recording material 12. In this arrangement, however, the angle of incidence of the replicating illumination light 13 on the reflection hologram plate 11 is limited to verticality or 0°.

To solve this problem, in the present invention a belt form of transmission hologram 14 having such a wavefront conversion action as explained with reference to FIG. 1 is wound around a reflection hologram recording material 12 as shown in FIG. 4(a). A cylindrical drum 10 is rotated in a direction shown by an arrow, so that, in unison with the rotation of the cylindrical drum 10, the reflection hologram recording material 12 can be fed at the same linear speed as the cylindrical drum 10 in a direction shown by an arrow. In unison with the rotation of the cylindrical drum 10, the transmission hologram 14, too, can be fed at the same linear speed as the cylindrical drum 10 and the same feed speed as the reflection hologram recording material 12 in a direction shown by an arrow. With these three parts, i.e., transmission hologram 14, reflection hologram recording material 12 and reflection hologram plate 11 having such position vs. feeding speed relations, they are relatively fixed at a position where they are aligned. Upon illumination light 13 directed toward a center C of the cylindrical drum 10, the illumination light 13 strikes vertically on the transmission hologram 14 irrespective of where it is rotated. Consequently, the illumination light 13 is diffracted relatively in the same direction irrespective of where the reflection hologram plate 11 is rotated, producing diffracted light 15. By using this diffracted light 15 as illumination light in any desired direction, it is possible to continuously replicate the reflection hologram plate 11 in the reflection hologram recording material 12 on the basis of the principle explained with reference to FIG. 2. With this method, not only vertical parallel light but also other incident illumination light of any desired configuration can be used for the continuous replication of the reflection hologram plate 11.

Figure 5:
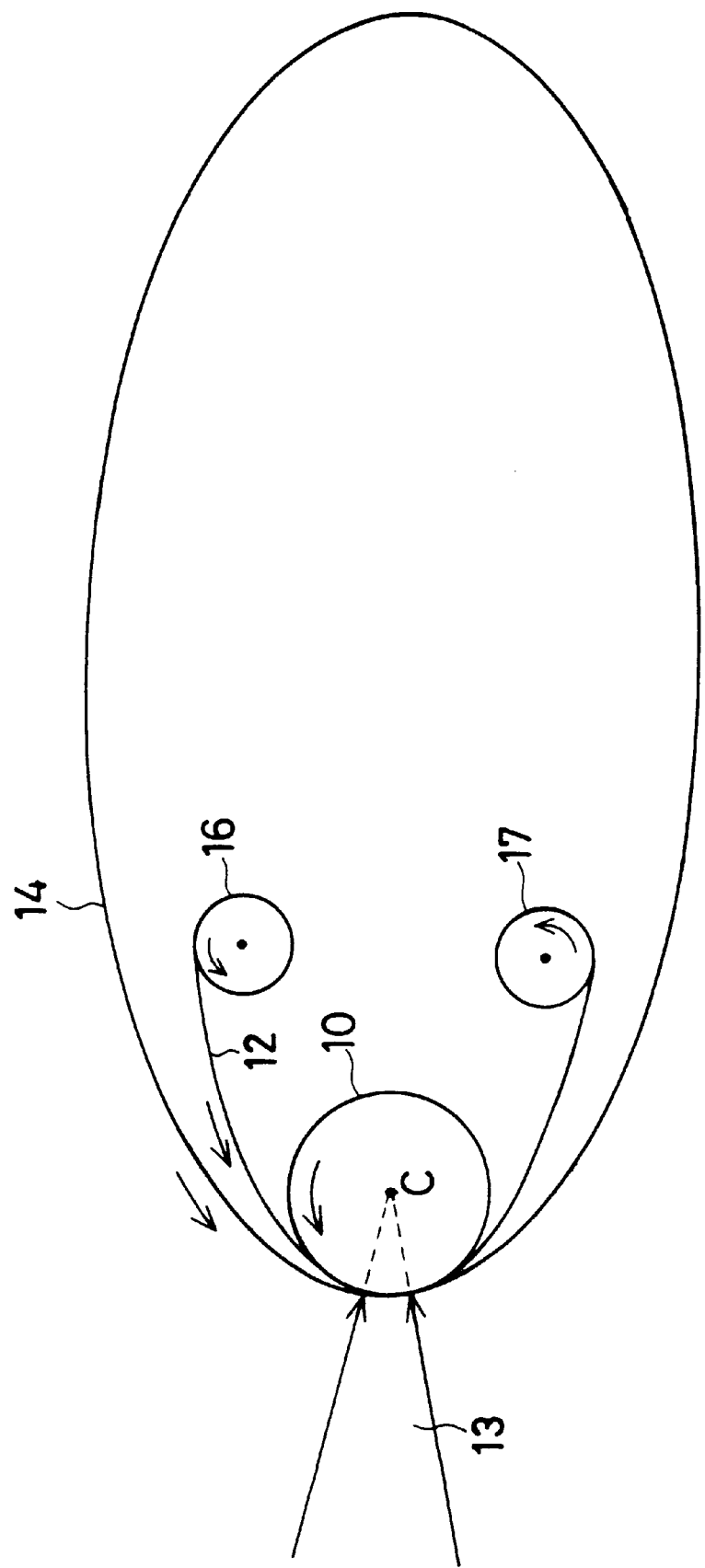
FIG. 5 is illustrative of the general arrangement for the continuous replication of a reflection hologram according to the present invention.

FIG. 5 is a general schematic illustrative of an arrangement for such continuous replication of a reflection hologram plate. A transmission hologram 14 is provided in the form of an endless belt with both ends connected with each other. The circumferential length of this endless belt is N times as long as that of a cylindrical drum 10, where N is an integer of at least 2. While a reflection hologram recording material 12 is fed from a roll-up drum 16 to a take-up roll 17, a reflection hologram plate 11 (see FIG. 4) put over the surface of the cylindrical drum 10 is continuously replicated therein.

While the method of recording, and replicating a reflection hologram according to the present invention has been described with reference to some preferred embodiments, it is to be understood that the invention is never limited thereto, and so many modifications may be possible.

With the method of recording, and replicating a reflection hologram according to the present invention, reference light or illumination light is allowed to strike on a reflection hologram recording material via a wavefront conversion type of transmission hologram for the recording, and replication of the reflection hologram, as can be understood from the foregoing. Consequently, even when reference light or illumination light is incident on the reflection hologram recording material at a large angle of incidence, the photographic material can be irradiated with the incident light with high exposure efficiency and a uniform quantity-of-light distribution over the irradiated surface. With a simple arrangement, it is possible to make the angle of incidence of illumination light larger than the critical angle. For continuous replication, it is possible to use not only vertical parallel light but also other incident light of any desired configuration.

What we claim is:

1. A reflection hologram-replicating method comprising the steps of:

replicating a reflection hologram plate in a reflection hologram recording material by locating a wavefront conversion type transmission hologram in close contact with or away from one surface side of said reflection hologram recording material;

locating a reflection hologram plate in close contact with or away from an other surface side of said reflection hologram recording material;

allowing illumination light to strike on said wavefront conversion type transmission hologram to produce a light beam in which at least one of a wavefront shape and a wavefront direction thereof is converted by said wavefront conversion type transmission hologram;

allowing said light beam to strike on said reflection hologram plate through said reflection hologram recording material to produce a diffracted light beam, wherein said reflection hologram plate is replicated in said reflection hologram recording material by interference between said light beams;

allowing said wavefront conversion type transmission hologram to have a wavefront conversion action on conversion of an almost vertically incident parallel light beam into a light beam in which at least one of said wavefront shape and said wavefront direction thereof differs;

allowing said reflection hologram recording material and said wavefront conversion type transmission hologram to each be provided in a belt form;

placing said reflection hologram plate over a surface of a cylindrical drum;

winding said reflection hologram recording material and said wavefront conversion type transmission hologram around said surface of said cylindrical drum in the described order;

rotating said cylindrical drum to feed said reflection hologram recording material and said wavefront conversion type transmission hologram at the same linear speed as said cylindrical drum and in unison with rotation of said cylindrical drum; and directing said illumination light toward a center of said cylindrical drum at a position where said reflection hologram recording material and said wavefront transmission hologram are in superposed alignment with said cylindrical drum.

* * * * *